United States Patent [19]

Eickelberg et al.

[11] 3,829,848

[45] Aug. 13, 1974

[54] STUCK ACTUATOR ALARM

[75] Inventors: John E. Eickelberg; James S. Rice, both of Columbus, Ohio

[73] Assignee: Industrial Nucleonics Corporation, Columbus, Ohio

[22] Filed: Mar. 29, 1971

[21] Appl. No.: 128,719

[52] U.S. Cl.................. 340/238, 340/164, 340/181
[51] Int. Cl. ............................................ G08b 21/00
[58] Field of Search ........ 340/213.1, 226, 164, 267, 340/181, 238

[56]    References Cited
   UNITED STATES PATENTS

| | | | |
|---|---|---|---|
| 2,672,601 | 3/1954 | Welby................................ | 340/226 |
| 2,768,369 | 10/1956 | Adelson............................. | 340/238 |
| 3,454,926 | 7/1969 | Kinzelman......................... | 340/226 |
| 3,543,261 | 11/1970 | Burney............................... | 340/261 |
| 3,564,493 | 2/1971 | Hicklin .............................. | 340/261 |

*Primary Examiner*—John W. Caldwell
*Assistant Examiner*—Marshall M. Curtis
*Attorney, Agent, or Firm*—Allan M. Lowe; William T. Fryer, III

[57]    ABSTRACT

A system for and method of determining if an actuator, such as a motor driving a stem of a valve in a line feeding a fibrous slurry to a paper making machine, is in a stuck condition includes a position transducer for the actuator. A control signal for the actuator may be periodically supplied to the actuator. A computer responds to the magnitude of the control signal and an indication of the actual position of the actuator, as derived by an analog-to-digital converter responsive to a position transducer for the actuator. The computer compares the position of the actuator before and after the control signal is supplied to the actuator. In response to the two positions being the same, a signal indicative of the amount the actuator should have moved in response to the control signal is derived and compared with a predetermined value for the minimum amount of detectable movement for the actuator to derive a stuck actuator alarm signal selectively.

10 Claims, 2 Drawing Figures

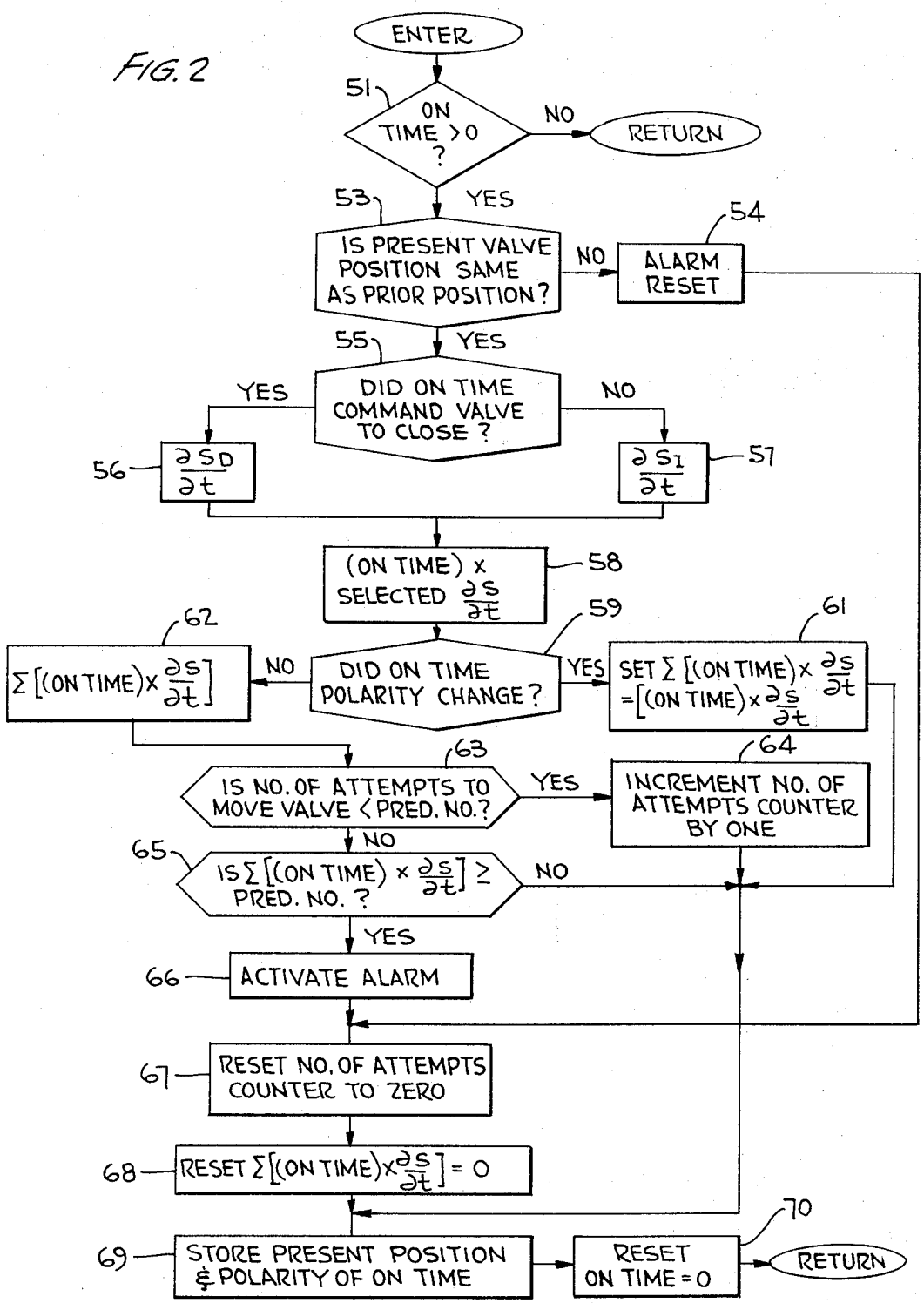

STUCK ACTUATOR ALARM

FIELD OF INVENTION

The present invention relates generally to alarm systems and method and more particularly to a system for and method of deriving an alarm signal in response to an indication that an actuator is in a stuck condition.

BACKGROUND OF THE INVENTION

In many control sytems, it is necessary to ascertain if an actuator for a controlled element is in a stuck condition. In paper making machines, in particular, stock valves in conduits feeding fibrous stock slurries to the machine are susceptible to sticking in a position midway between the extreme stop positions for the valve. One technique for determining if a valve is in a stuck condition is to provide a flow meter downstream of the valve, whereby for certain command or control signals supplied to the valve a corresponding resulting change should be derived in the response of the flow meter. The use of a flow meter, however, involves a substantial expenditure of funds. Another possible technique is to monitor the output of the machine to determine the amount of fiber in the produced sheet. If changes in a command signal for the stock valve are not reflected in changes in the fiber weight of the sheet, an indication of valve sticking is provided. The transport time of fibers from the stock valve to the output of the machine, however, is appreciable, on the order of two minutes, so that this technique is beset by substantial delay in ascertaining a stuck valve condition.

BRIEF DESCRIPTION OF THE INVENTION

In accordance with the present invention, a system is provided for determining if an actuator is in a stuck condition. A transducer for determining the position of the actuator derives a signal that is fed with a predetermined degree of resolution to a system capable of deriving an indication that the actuator is in a stuck condition, which system can be in the form of a digital computer. Control or error signals for the actuator may be periodically derived in response to a comparison of an output of a system responsive to the actuator and a predetermined value for the output. In response to the magnitude of the error signal the actuator is driven by an amount that may be greater or less than the resolving capability of the position transducer.

In response to the position of the actuator, as monitored by the position transducer, being the same before and after the control signal is supplied to the actuator, there is computed a signal indicative of the amount the actuator should have moved in response to the control signal. The amount the actuator should have moved in response to the control signal may be less than the resolving accuracy of the position transducer. To determine if the magnitude of the control signal was less than the resolving accuracy of the position transducer, the calculated value that the actuator should have moved is compared with a value indicative of the minimum amount of detectable movement for the actuator, i.e., the resolving accuracy of the transducer. In response to an indication that the amount the actuator should have moved being greater than the minimum resolving accuracy of the position transducer, an alarm signal is derived. An alarm is not inaccurately derived, however, if the resolving accuracy of the position transducer is greater than the calculated value the actuator should have moved.

It is, accordingly, an object of the present invention to provide a new and improved system for and method of detecting if a position actuator is in a stuck condition and for deriving an alarm in response to a stuck condition.

Another object of the invention is to provide a new and improved system for and method of providing an alarm indicative of an actuator being in a stuck condition in response to a comparison of the position of the actuator prior to and subsequent to the application of a control signal.

An additional object of the invention is to provide a system for and method of determining if an actuator is in a stuck condition, wherein the actuator is periodically driven in response to control signals of variable amplitude that may command the actuator to move by an amount less than the resolving accuracy of a transducer for the actuator position.

A further object of the invention is to provide a new and improved system for and method of monitoring a stuck condition of a valve in the input line of a fluid feeding a processing machine wherein the only parameters utilized for making the determination are control signals for the valve position and measurements derived from position transducers for the valve.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWING

FIG. 2 is a flow diagram of the operations performed by the digital computer illustrated in FIG. 1.

DETAILED DESCRIPTION OF THE DRAWING

Figure 1:
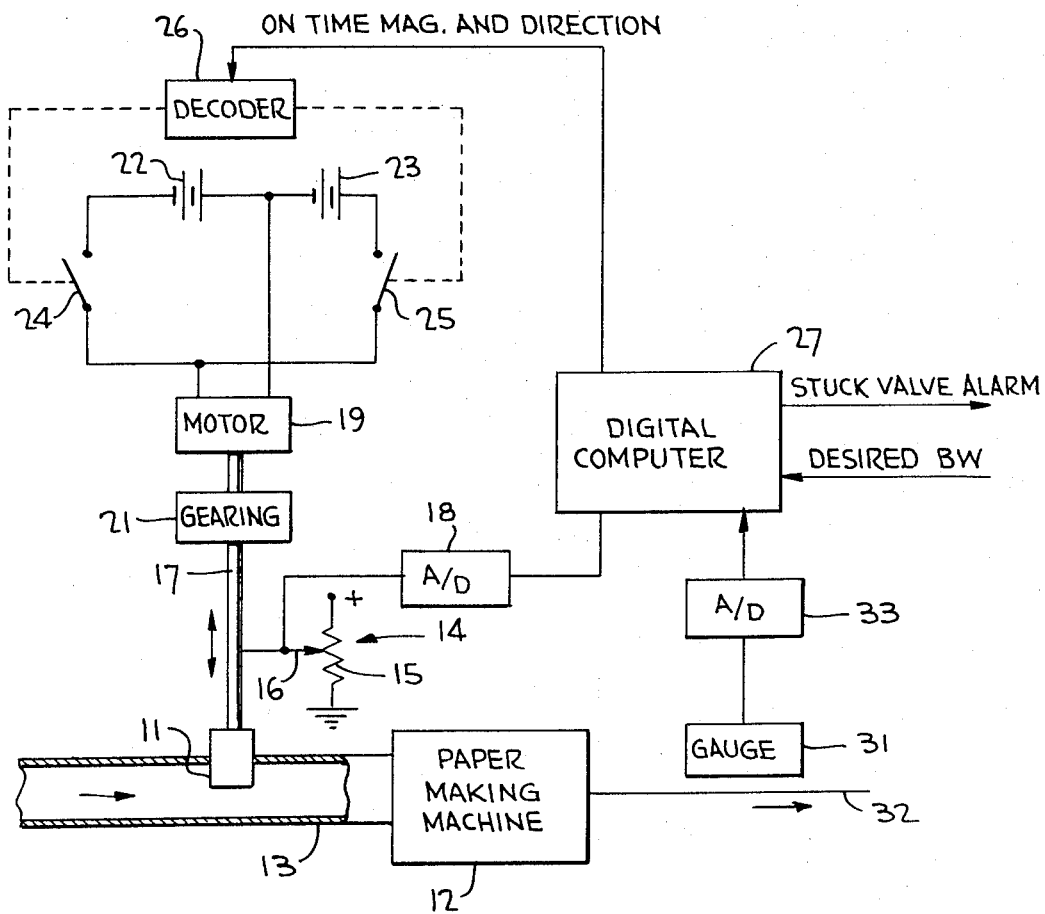
FIG. 1 is a block diagram of one embodiment of the present invention.

Reference is now made specifically to FIG. 1 wherein the invention is illustrated in conjunction with valve 11 which controls the amount of fibrous slurry fed to paper making machine 12 through conduit or pipe 13. The purpose of the system illustrated in FIG. 1 is to determine if valve 11 is stuck at some intermediate position between its top and bottom stops, even though no flow transducer is provided in pipe 13 downstream of valve 11. It is recognized that other controlled valves on the paper machine, as well as in other processes can use this invention.

The position of valve 11 is determined by position transducer 14 which comprises resistance 15 over which slider 16 is driven by virtue of its fixed connection to stem 17 of valve 11. The position of slider 16 on resistance 15 is indicated by the voltage at the slider that is fed to analog-to-digital converter 18. Analog-to-digital converter 18 typically has a resolution of one part in a thousand, i.e., 0.1 percent, for the movement of stem 17. Thereby, in response to the movement of stem 17 being less than a predetermined value, there is no change in the magnitude of the output signal derived by converter 18.

Stem 17 is driven through gearing 21 in either an upward or downward direction in response to counter-clockwise or clockwise rotation of constant speed motor 19. Motor 19, which for purposes of simplicity is illustrated as being of the d.c. type and responsive to opposite polarity d.c. sources 22 and 23, may be periodically connected to one of the d.c. sources for variable time periods in response to selective closure of switches 24 and 25. Switches 24 and 25 are selectively closed for variable time intervals to drive stem 17 by differing extents in response to output signals generated by decoder 26. Decoder 26 is responsive to a digital signal derived by general purpose digital computer 27, which signal indicates the desired direction and extent of movement of stem 17. The digital signal supplied to decoder 26 by computer 27 includes a polarity indicating bit and a number of magnitude indicating bits; the latter being translated into different on-time durations for switches 24 and 25. Decoder 26 responds to the polarity and on-time bits supplied thereto by computer 27 to generate control signals for switches 24 and 25. Each control signal generated by decoder 26 closes one of switches 24 or 25 for a length of time indicated by the magnitude bits supplied to the decoder by computer 27.

Digital computer 27, being of the general purpose type, includes the usual elements of input and output buses and buffers, a memory and an arithmetic unit wherein various calculations and comparison operations are performed. In addition, computer 27 includes output elements such as alarm indicators, in the form of visual and aural alarms, and a device for printing indications derived from the computer, such as an automatic typewriter. Computer 27 is scanned through a set of sequenced operations or a program either periodically or in response to the occurrence of some event in the paper making machine or apparatus associated therewith. For the present purpose, the program is repeated approximately once every two minutes. Once during each execution of the programs the computer derives a signal indicative of the on-time magnitude and direction that is fed to decoder 26. The signal supplied by the computer to decoder 26 is derived in response to signals derived from a gauge 31 that monitors the fiber weight per unit area of paper web 32 produced by paper making machine 12. The output signal of gauge 31 is generally in analog form and is converted into a digital signal by analog-to-digital converter 33. The computer responds to the output signal of converter 33 and compares it with a desired fiber weight per unit area signal supplied to the computer by an operator to derive, once during each program sequence, the bidirectional signal fed to decoder 26. It is to be understood that more complex means can be employed for deriving the signal supplied by computer 27 to decoder 26.

After digital computer 27 supplies an output signal to decoder 26 to control the position of stem 17, the computer makes a determination as to whether or not stem 17 is in a stuck position. In many instances, the stuck position determination can be performed by comparing a signal stored in computer 27 indicative of the position of stem 17 prior to and after an on-time signal being supplied by the computer to decoder 26. The comparison is performed within computer 27 by feeding signals in two different memory locations to a comparison network included in the arithmetic unit of the computer. It is performed a sufficient time period after derivation of the on-time signal to enable motor 19 to drive stem 17 through a detectable distance.

In other instances, however, the on-time output signal of computer 27 is so small in magnitude that motor 19 drives stem 17 for such a small time period and through such a short distance that the change in the position of the stem is not reflected in a change in the magnitude of the signal supplied to computer 27 by analog-to-digital converter 18. To prevent the computer from erroneously providing an indication that valve 11 is stuck under such a situation, the computer program includes a sub-routine for calculating the distance valve 11 should have moved for the on-time fed to decoder 26. If the computed distance is less than the minimum change in the movement of stem 17 that can be reflected in the output of analog-to-digital converter 18 the computer 27 does not generate a stuck valve alarm.

In certain instances, it has been found desirable to repeatedly make a stuck valve determination in digital computer 27, rather than rely upon the first indication. If the stuck valve alarm is activated after several attempts are made to drive stem 17, the several computations of the distance valve 11 should have been moved in response to each program sequence of computer 27 are accumulated and compared with a minimum accumulated motion detectable by position sensor 14. For example, if the minimum detectable resolution of position sensor 14 and analog-to-digital converter 18 is one part in a thousand and three successive on-time magnitudes of 0.4 parts in a thousand are supplied by computer 27 to decoder 26, no detectable change in the output of converter 18 may occur until the third ontime signal is coupled by the computer to the decoder, even though valve 11 is not stuck. The accumulated value of 1.2 parts in one thousand sensed by converter 18 is compared with a value of one part in a thousand in computer 27 after the third on-time signal has been supplied to decoder 26. In response to a comparison of the 1 and 1.2 parts in one thousand signals, computer 27 will not provide a stuck valve alarm signal. If, however, the output of converter 18 does not change in response to three successive 0.4 parts in a thousand on-time signals being supplied by computer 27 to decoder 26, the computer derives a stuck valve alarm signal to provide an indication with an extremely high degree of probability that the valve is not moving and is in a stuck condition.

The program of computer 27 for deriving the stuck valve alarm condition includes other features, as the following detailed description of the program reveals. Prior to the stuck valve alarm program of FIG. 2 being executed a different portion of the computer program computes the on-time magnitude and direction of movement for stem 17. The program sequences to the stuck valve alarm routine a predetermined time interval after the on-time calculation, which interval is sufficiently great to enable at least initial drive of motor 19 and translation of stem 17 and sampling of the output of analog-to-digital converter 18. It is to be understood that each of the operations indicated by the flow chart is performed in a register in the computer arithmetic unit and the result stored in a memory location from which it is subsequently retrieved. The arithmetic unit can be activated to cumulatively combine signals from memory, compare signals from memory, set signals from memory to different values, and made to function as a counter for incrementing signals from memory, as well as other well known functions.

The first step in the program involves sampling the ontime just previously fed by computer 27 to decoder 26, the operation indicated in FIG. 2 by decision element 51. In response to an on-time magnitude of zero, there is no possible movement of stem 17 so that further operations associated with detecting a stuck condition of actuator stem 17 for valve 11 are meaningless. Thereby, the stuck valve alarm routine is exited, as indicated by return operation 52. Return operation 52 signifies that the remainder of the stuck valve alarm routine will not be executed and that the calling or main program is reentered to enable the next sequence of operations in the main program to be executed by the digital computer. It is to be understood that the operations discussed herein are only a small segment of the total number of operations within the main or calling program of computer 27 and that approximately 2 minutes are required to return again to the entry of the stuck valve alarm subroutine.

In response to computer 27 ascertaining that a finite on-time for motor 19 was derived during operation 51, the remainder of the stuck valve alarm routine is executed, as indicated by the "yes" output of decision element 51. The next step 53 in the program involves a determination as to whether or not stock valve 11 appeared to move in response to the on-time signal derived by a digital computer 27. Operation 53 is performed by comparing in computer 27 the position of valve 11 prior to derivation of the on-time signal, as stored in an appropriate memory location within the computer, with the sampled value of the position of stem 17, as derived by converter 18 after the on-time signal was supplied to decoder 26. In response to the comparison indicating that there was movement of stem 17 in response to the one-time signal, the stuck valve alarm is reset or prevented from being activated, as indicated by operation 54. Other operations associated with resetting counters and accumulators included in the stuck valve routine are performed in response to an indication being derived that the position of valve 11 has changed, as described infra.

In response to operation 53 indicating that there has been no apparent movement of stem 17, as indicated by the "yes" output, a sequence of steps is performed to compute the distance stem 17 and valve 11 should have moved in response to the on-time magnitude supplied to decoder 26. The computation is made basically by multiplying the magnitude of the on-time with a signal indicative of the rate of change of the position of valve 17 with respect to time, $\delta S/\delta t$. The value of $\delta S/\delta t$ is a predetermined constant throughout the movement of valve stem 17, although the constant has different values in response to the valve being closed compared to the valve being opened.

Before the computation can be performed, it is necessary to determine the direction in which stem 17 should have been moved in response to the output signal supplied by computer 27 to decoder 26. This determination is necessary because, among other things loading on the valve by liquid flowing through conduit 13 can change the rate at which the valve can be translated to increase and decrease the flow through the conduit. The direction of the on-time computation is performed during operation 55 in response to the polarity bit of the on-time signal supplied by computer 27 to decoder 26. In response to the polarity indicating bit indicating that there is a decrease in the opening of valve 11, a signal indicative of the constant time rate of change of valve position with respect to time for the valve being closed, $\delta S_D/\delta t$, is retrieved from memory and stored in a register within the arithmetic unit of the digital computer, as indicated by operation 56. In response to an increase being sensed during operation 55, operation 57 is performed so that the value $\delta S_I/\delta t$ (where $\delta S_I/\delta t$ = constant rate of change with respect to time of position of valve 11 when the valve is being opened) is retrieved from memory and stored in the register of the arithmetic unit of the computer. After operation 55 has been completed and the appropriate rate of change value, $\delta S_I/\delta t$ or $\delta S_D/\delta t$, is stored in a register of arithmetic unit, the magnitude of the on-time is multiplied by the $\delta S/\delta t$ value retrieved from memory, as indicated by operation 58. The result of operation 58 indicates the theoretical distance valve 11 and its activating stem 17 should have moved in response to the on-time fed by computer 27 to decoder 26.

The next decision made during the computer program involves determining whether or not the on-time calculated during the presently considered program cycle was in the same direction as the on-time calculated during the program cycle one cycle preceding the present cycle. This determination, performed during decision operation 59, involves comparing in the computer arithmetic unit signals retrieved from memory and having bits indicative of the polarities of the on-time signals fed by the computer to decoder 26 during the present and just previous stuck valve alarm program cycles. In response to operation 59 indicating that the direction of movement of stem 17 should have been different for the two successive stuck valve alarm program cycles an accumulated value of the computed distance that valve 11 should have moved is set to the value determined during operation 58, as indicated by operation 61. After operation 61 has been completed another accumulator and a counter are reset and the stuck valve alarm subroutine is exited without the stuck valve alarm signal being generated, as described infra. A stuck valve condition is not assumed when the on-time signal changes polarity. For example, it often occurs that the backlash between motor 19 and slider 16, usually occurring in gearing 21, is not fully taken up with the completion of the first on time in the opposite direction and thus an indication of the failure of the valve to move under that condition would be prevented.

In response to the decision of operation 59 indicating that the on-time signal does not change polarity, the program is advanced to operation 62, during which the value that valve 11 should have moved, computed during operation 58, is accumulated with previous computed values for the distance valve 11 should have moved. The accumulation is performed in those instances wherein numerous attempts are made during succeeding stuck valve alarm program cycles, i.e., approximately every 2 minutes, prior to an indication of a stuck valve alarm being generated.

After operation 62 has been performed, a determination is made during operation 63 as to whether the actual number of attempts to move valve stem 17 unsuccessfully equals a predetermined number. The predetermined number is the number of attempts to move the valve stem which will be considered as a stuck valve condition and is typically between one and three. The predetermined number and a number stored in memory indicative of the actual number of attempts that have been made to move the valve are read from memory into the arithmetic unit where a comparison is performed. In response to the comparison indicating that the number of attempts is less than the predetermined value, the program is advanced to operation 64, during which the register storing the number of attempts is incremented by a count of one and the result returned to memory. Upon completion of operation 64 additional operations (described infra) are performed relating to returning the program to the main or calling program.

In response to operation 63 indicating that the number of attempts is equal to the maximum predetermined number of attempts, the program is stepped from operation 63 to operation 65. During operation 65 a determination is made as to whether or not valve stem 17 should have appeared to move in response to the accumulation of the computed valve movements, as determined during operation 62. Operation 65 is performed by retrieving from memory the accumulated value determined during operation 62 and a predetermined value indicative of the minimum resolution of the position determining apparatus 14, as reflected in the output of analog-to-digital converter 18. In the specific analog-to-digital converter described supra, the predetermined value read from memory into the arithmetic unit during operation 65 is, therefore, one part in a thousand. From a comparison of the accumulated computed valve movement (operation 62) and the predetermined value for minimum detectable movement of valve stem 17, a determination is made as to whether or not the valve stem 17 should have appeared to move in response to the control or on-time signals fed to it. In response to the computed accumulated value being less than the minimum detectable value, a stuck valve condition cannot be assumed whereby a no output signal is derived during operation 65 and the computer program is advanced in the same manner as it is advanced in response to completion of operation 64.

In response to the accumulated computed value being greater than the resolution of valve stem measuring system 14, as reflected in the output of analog-to-digital converter 18, the program advances from operation 65 to stuck valve alarm operation 66. In response to the stuck valve alarm flag of operation 66 being derived, aural and visual alarm indicators in output circuits of digital computer 27 are energized, or an automatic typewriter responsive to digital computer is energized to print out automatically a stuck valve alarm signal indication.

After a stuck valve alarm condition has been sensed during operation 66, counters and accumulators associated with the stuck valve routine are reset during operations 67 and 68 so that further determinations of a stuck valve condition can be determined during subsequent stuck valve program cycles. Resetting operations 67 and 68 are also performed in response to completion of operation 54 that indicates stock valve stem 17 has moved. During operation 67, the contents of the memory location storing the number of attempts made to move valve stem 17 are fed to a register in the arithmetic unit and the register is reset to zero. After the register has been reset to zero, the zero signal is returned to the location in memory designated for the number of attempts. Upon completion of operation 67, the contents of the memory location storing the accumulated value of computed valve movement, as determined during operation 62, are fed to a register in the arithmetic unit and the register is set to zero. After the register has been set to zero, the zero signal is fed back to the memory location set aside for the computed value of the movement of valve stem 17.

After operations 61, 64 or 68 have beem completed or operation 65 indicates that the amount of movement for stem 17 is less than the resolution of measuring transducer 14 and converter 18, whichever one of the four is applicable, operations 69 and 70 are performed in seriatim. During operation 69 the position of valve stem 17, as derived from analog-to-digital converter 18, is fed from a buffer memory location to a permanent memory location. After the actual valve position has been appropriately stored, a binary word indicative of the polarity of the on-time signal supplied by computer 27 to decoder 26 during the presently considered computer operation period is fed to an appropriate permanent memory location. Upon completion of operation 69, the value of on-time supplied by computer 27 to decoder 26 during the presently considered operating cycle is reset to zero. Thereby, at the beginning of the next succeeding program cycle there are stored in memory appropriate initial conditions to enable accurate determination of the on-time control signal magnitude and stuck valve condition.

While there has been described and illustrated one specific embodiment of the invention, it will be clear that variations in the details of the embodiment specifically illustrated and described may be made without departing from the true spirit and scope of the invention as defined in the appended claims.

We claim:

1. A system for determining if an actuator that is movable to a multiplicity of positions between limits is in a stuck condition comprising a position transducer for sensing the actuator position at the multiple positions and for deriving a different signal indicative of the actuator position at each of the positions, means for deriving a control signal selectively indicative of any of the multiple positions of the actuator, means for supplying the control signal to the actuator, means responsive to the sensed position signal of the actuator, as derived by the transducer, after the control signal is supplied to the actuator relative to the sensed position before the control signal is supplied to the actuator for deriving a no-move signal in response to the sensed before and after positions being the same, means responsive to the control signal and activated by the no-move signal for deriving a signal indicative of the amount the actuator should have moved in response to the control signal, and means comparing the signal indicative of the amount the actuator should have moved with a predetermined value for deriving an alarm signal in response to the amount the actuator should have moved being greater than the predetermined value, said predetermined value being equal to at least the minimum detectable movement by said transducer of said actuator position.

2. The system of claim 1 wherein said transducer includes means for converting the position of the actuator, as derived by the transducer, into a digital signal having a predetermined resolution, said predetermined value being equal to the resolution of the digital signal.

3. The system of claim 1 further including means for repeatedly supplying the control signal to the actuator activating the position comparing means a predetermined number of times prior to deriving the alarm signal.

4. The system of claim 3 wherein the means for deriving a signal indicative of the amount the actuator should have moved includes means for accumulating the amplitude of the repeatedly derived signals indicative of the amount the actuator should have moved, said alarm signal deriving means being responsive to the amplitude of the accumulated signals.

5. The system of claim 1 further including means for sensing a change in the polarity of the control signal, and means for preventing the alarm signal from being derived in response to a sensed change in the control signal polarity.

6. A method of determining if an actuator that is movable to a multiplicity of positions between limits is in a stuck condition in response to a signal received from a position transducer for the actuator, said transducer sensing the actuator position at the mulitple positions and deriving a different signal indicative of the actuator position at each of the positions, comprising deriving a control signal selectively indicative of any of the mulitple positions of the acutator, supplying the control signal to the actuator; comparing the position of the acutator, as derived by the transducer, after the control signal is supplied to the actuator relative to the sensed position before the control signal is supplied to the actuator; in response to the compared positions being the same, deriving a signal indicative of the amount the actuator should have been moved as a result of the control signal; comparing the signal indicative of the amount the actuator should have moved with a predetermined value; and deriving an alarm signal in response to the amount the actuator should have moved being greater than the predetermined value, said predetermined value being equal to at least the minimum detectable movement by said transducer of said actuator position.

7. The method of claim 6 further including converting the indication of the position of the actuator, as derived by the transducer, into a digital signal having a predetermined resolution, said predetermined value being equal to the resolution of the digital signal.

8. The method of claim 6 further including repeatedly supplying the control signal to the actuator a predetermined number of times prior to deriving the alarm signal.

9. The method of claim 8 further including accumulating the amplitude of the repeatedly derived signals indicative of the amount the actuator should have moved, said alarm signal being derived in response to the amplitude of the accumulated signals.

10. The method of claim 6 further including sensing a change in the polarity of the control signal, and preventing the alarm signal from being derived in response to a sensed change in the control signal polarity.

* * * * *